United States Patent
Sasaki et al.

(10) Patent No.: US 11,435,264 B2
(45) Date of Patent: Sep. 6, 2022

(54) PROBE DEVICE CAPABLE OF SUPPRESSING DAMAGE WHILE ALSO SUPPRESSING INCREASE IN LABOR FOR MOUNTING WORK

(71) Applicant: MITSUBISHI HEAVY INDUSTRIES COMPRESSOR CORPORATION, Tokyo (JP)

(72) Inventors: Yuichi Sasaki, Hiroshima (JP); Yasuhiko Kawamura, Hiroshima (JP)

(73) Assignee: MITSUBISHI HEAVY INDUSTRIES COMPRESSOR CORPORATION, Tokyo (JP)

(*) Notice: Subject to any disclaimer, the term of this patent is extended or adjusted under 35 U.S.C. 154(b) by 0 days.

(21) Appl. No.: 17/151,887

(22) Filed: Jan. 19, 2021

(65) Prior Publication Data

US 2021/0223142 A1    Jul. 22, 2021

(30) Foreign Application Priority Data

Jan. 21, 2020    (JP) ............................. JP2020-007468

(51) Int. Cl.
  *G01M 15/14*    (2006.01)
  *G01N 29/22*    (2006.01)

(52) U.S. Cl.
  CPC .......... *G01M 15/14* (2013.01); *G01N 29/223* (2013.01); *G01N 2291/2693* (2013.01)

(58) Field of Classification Search
  CPC .......... G01M 15/14; G01N 2291/0258; G01N 2291/2693; G01N 29/14; G01N 29/223
  See application file for complete search history.

(56) References Cited

U.S. PATENT DOCUMENTS

| 6,463,805 B1 * | 10/2002 | Nishizono | ............. G01N 29/12 |
| | | | 73/663 |
| 2021/0293611 A1 * | 9/2021 | Oda | ................... G01M 13/045 |

FOREIGN PATENT DOCUMENTS

| EP | 3489640 A1 | 5/2019 | |
| JP | H02-110832 U | 9/1990 | |
| JP | H04-034634 U | 3/1992 | |
| JP | 3593282 B2 * | 11/2004 | .......... G01M 15/042 |
| JP | 2011252875 A * | 12/2011 | |
| JP | 2016153644 A * | 8/2016 | |
| WO | 2018-104981 A1 | 6/2018 | |

* cited by examiner

*Primary Examiner* — David L Singer
(74) *Attorney, Agent, or Firm* — Osha Bergman Watanabe & Burton LLP

(57) ABSTRACT

A probe device includes a probe that detects a state of a rotary shaft, a probe holding member having a first end fixed to a bearing portion, in which the probe is fixed to the first end, a cylindrical guide sleeve inserted into a communication hole of a casing, a second end of the probe holding member being inserted into the cylindrical guide sleeve, and a plurality of elastic support members disposed at an interval in an extending direction of the probe holding member between the second end of the probe holding member and an inner peripheral surface of the guide sleeve, and formed of an elastic material to form an annular shape extending along an outer peripheral surface of the probe holding member.

4 Claims, 4 Drawing Sheets

PROBE DEVICE CAPABLE OF SUPPRESSING DAMAGE WHILE ALSO SUPPRESSING INCREASE IN LABOR FOR MOUNTING WORK

BACKGROUND OF THE INVENTION

Field of the Invention

The present disclosure relates to a probe device.

Priority is claimed on Japanese Patent Application No. 2020-007468, filed on Jan. 21, 2020, the content of which is incorporated herein by reference.

Description of Related Art

A rotary machine such as a steam turbine includes a rotary shaft. Various sensors such as a vibration meter are provided to monitor the state of the rotary shaft during an operation of the rotary machine. For example, PCT International Publication No. WO2018/104981 discloses a configuration including a probe of a vibration meter fixed to a bearing device for supporting a rotary shaft, a guide cylinder provided to penetrate a casing (case) located outside the bearing device, and a mounting tool connected to the probe and inserted into the guide cylinder. In this configuration, the mounting tool has a male screw portion screwed into a female screw hole formed in the bearing device. In addition, the mounting tool is fixed to the guide cylinder or the casing by using a nut screwed to an outside of the casing.

SUMMARY OF THE INVENTION

Incidentally, in the configuration disclosed in PCT International Publication No. WO2018/104981, the mounting tool connected to the probe is fixed by screwing one end of the mounting tool to the bearing device. In addition, the other end is fixed to the guide cylinder or the casing by using the nut. Therefore, when the nut is tightened, a tensile force acts on a mounting portion in a direction in which one end and the other end are connected to each other. As a result, when the nut is tightened too strongly, the mounting tool may be broken or damaged in some cases. In order to prevent this case, it is possible to strictly control the tightening torque of the nut. However, this requires an increase in labor for mounting work.

The present disclosure provides a probe device capable of suppressing damage while also suppressing an increase in labor for mounting work.

According to the present disclosure, in order to solve the above-described problem, a probe device is provided that is configured to measure a state of a rotary shaft supported by a bearing portion located inside a casing of a rotary machine. The probe device includes a probe that is configured to detect the state of the rotary shaft, a probe holding member having a first end which is configured to fix to the bearing portion in which the probe is fixed to the first end, a guide sleeve is configured to insert into a communication hole through which an inside and an outside of the casing communicate with each other and is formed a cylindrical shape, a second end of the probe holding member being inserted into the cylindrical guide sleeve, and a plurality of elastic support members disposed at an interval in an extending direction of the probe holding member connecting the first end and the second end to each other between the second end of the probe holding member and an inner peripheral surface of the guide sleeve and formed of an elastic material to form an annular shape extending along an outer peripheral surface of the probe holding member.

According to the probe device of the present disclosure, damage can be suppressed while an increase in labor for mounting work is also suppressed.

DETAILED DESCRIPTION OF THE INVENTION

Hereinafter, an embodiment of a rotary machine according to the present disclosure will be described with reference to the accompanying drawings. However, the present disclosure is not limited only to this embodiment.

(Configuration of Steam Turbine)

Figure 1:
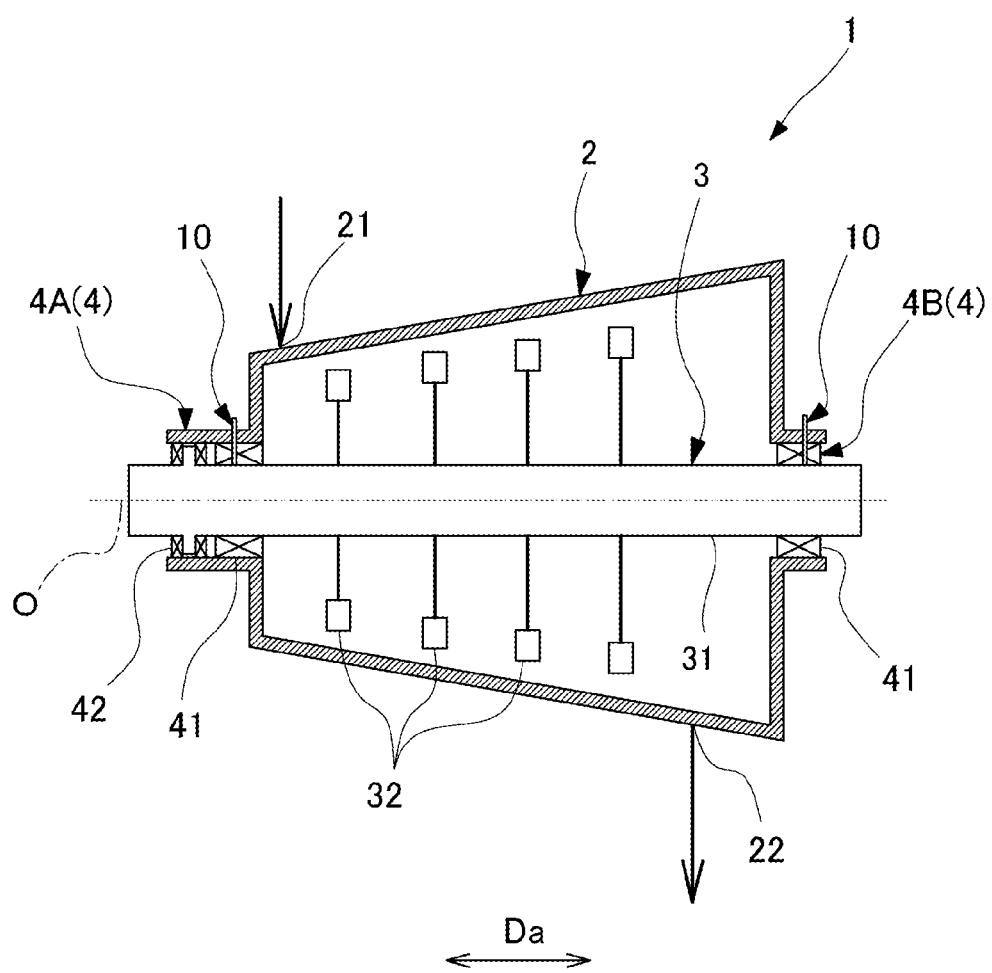
FIG. 1 is a schematic view illustrating a configuration of a rotary machine according to an embodiment of the present disclosure.

Hereinafter, the rotary machine according to the embodiment of the present disclosure will be described with reference to FIGS. 1 to 4. In the embodiment of the present disclosure, a steam turbine will be described as an example of the rotary machine. As illustrated in FIG. 1, a steam turbine 1 serving as the rotary machine includes a casing 2, a rotor 3, and a bearing portion 4.

(Configuration of Casing)

The casing 2 has a cylindrical shape extending in an axial direction Da. The axial direction Da is an extending direction of a center axis O of the rotor 3. The casing 2 has a steam inlet 21 and a steam outlet 22. The steam inlet 21 is disposed at a position close to an end portion on a first side in the axial direction Da in the casing 2. The steam inlet 21 introduces steam into the casing 2 from an outside of the casing 2. The steam outlet 22 is disposed at a position close to an end portion on a second side in a direction of the center axis O in the casing 2. The steam outlet 22 discharges the steam flowing into the casing 2 to the outside.

(Configuration of Rotor)

The rotor 3 includes a rotary shaft 31 and rotor blades 32. The rotary shaft 31 is accommodated inside the casing 2. The rotary shaft 31 extends in the axial direction Da around the center axis O. Both end portions of the rotary shaft 31 in the axial direction Da are supported to be rotatable around the center axis O by the bearing portion 4 fixed to the casing 2. The rotor blades 32 are disposed in a plurality of stages at an interval in the axial direction Da of the rotary shaft 31. Each of the rotor blade 32 is provided on an outer peripheral surface of the rotary shaft 31 to extend outward in a radial direction Dr around the center axis O of the rotary shaft 31.

The bearing portion 4 is disposed inside the casing 2. The bearing portion 4 includes a first bearing portion 4A and a second bearing portion 4B. The first bearing portion 4A is disposed at a position close to an end portion of the casing 2 on a first side in the axial direction Da. The first bearing portion 4A includes a journal bearing 41 that supports the rotary shaft 31 to be rotatable around the center axis O, and a thrust bearing 42 that supports the rotary shaft 31 in the axial direction Da. The second bearing portion 4B is disposed at a position close to an end portion of the casing 2 on a second side in the axial direction Da. The second bearing portion 4B includes the journal bearing 41.

(Configuration of Probe Device)

Figure 2:
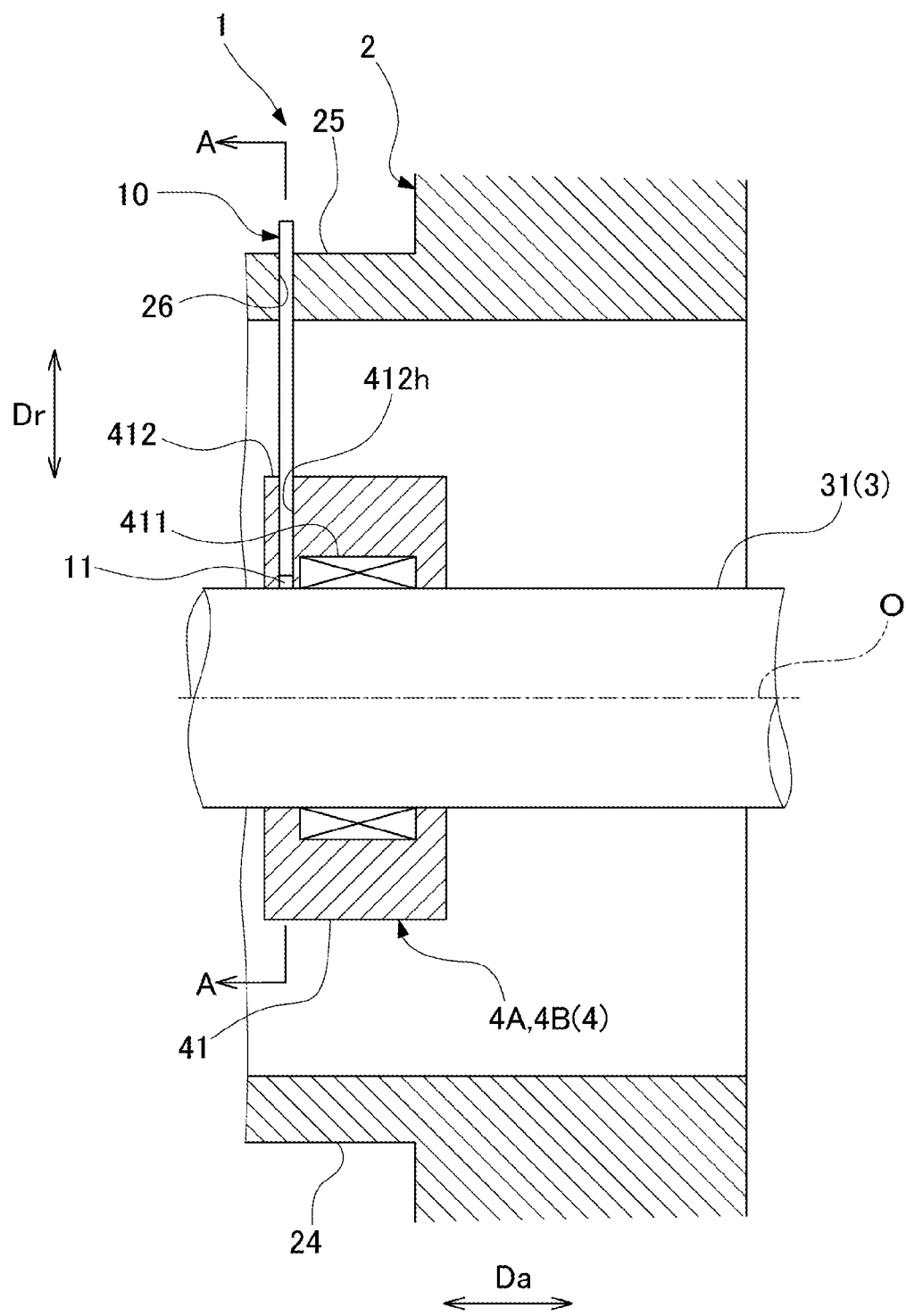
FIG. 2 is a sectional view illustrating a probe device provided in a bearing portion of the rotary machine.
Figure 3:
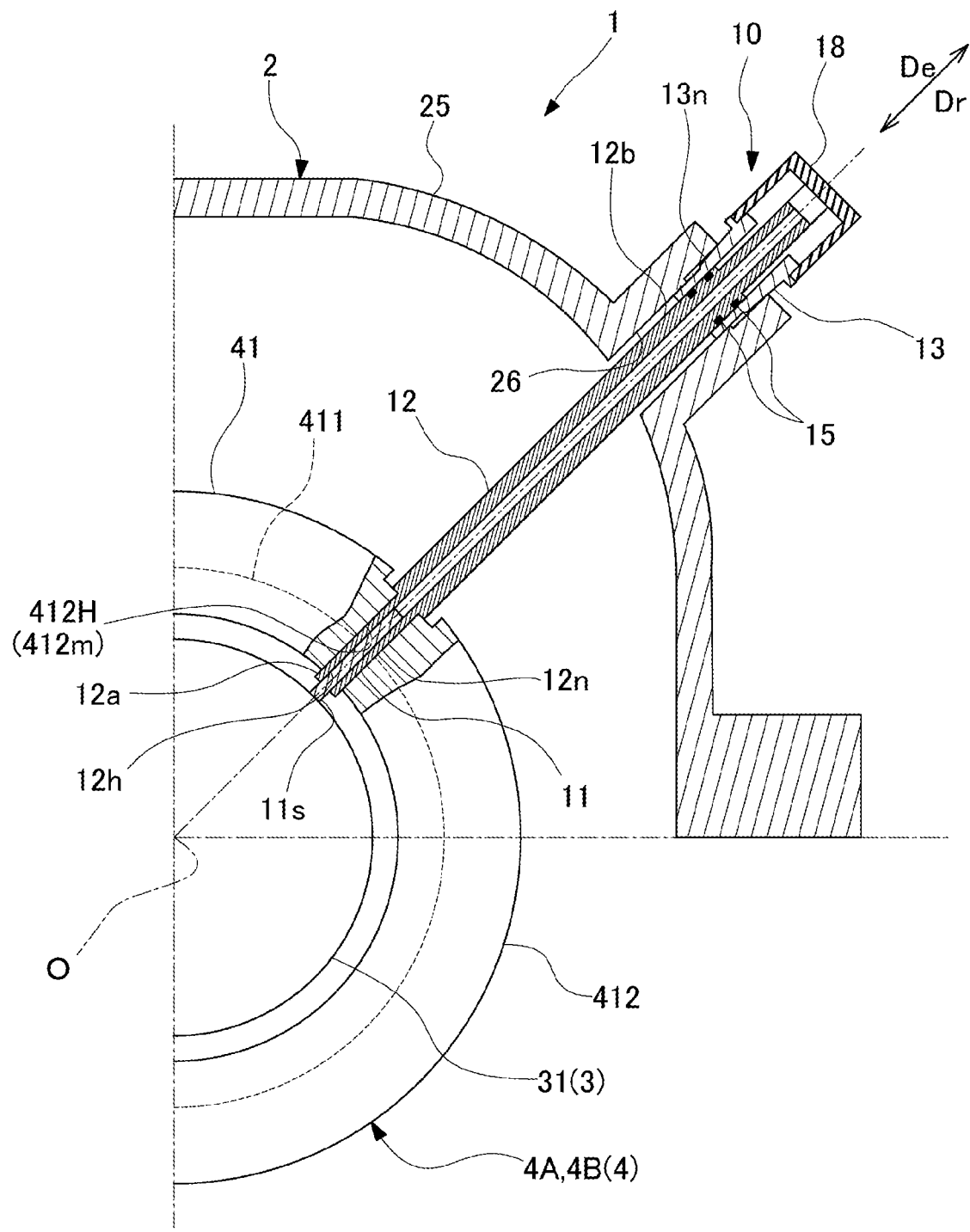
FIG. 3 is a sectional view taken along line A-A in FIG. 2.
Figure 4:
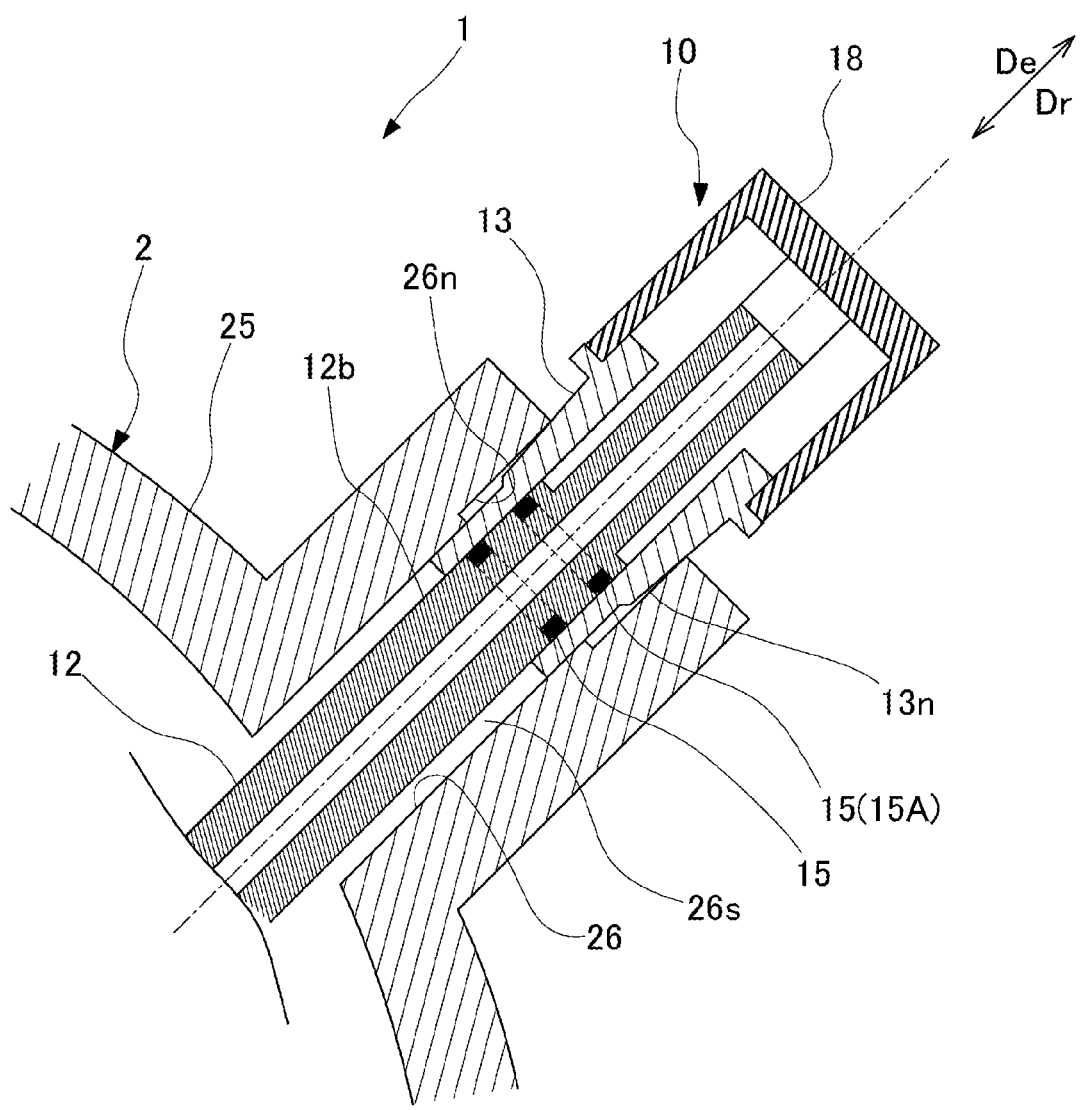
FIG. 4 is an enlarged sectional view illustrating a main portion of the probe device.

As illustrated in FIGS. 2 and 3, the probe device 10 including the probe 11 is attached to each journal bearing 41 of the first bearing portion 4A and the second bearing portion 4B. Each journal bearing 41 is disposed on a bearing pedestal 24 provided integrally with the casing 2. The journal bearing 41 includes a bearing main pad 411 and a bearing housing 412. The bearing main pad 411 has an annular shape, and the rotary shaft 31 is inserted into the bearing main pad 411 in the radial direction Dr. The bearing housing 412 supports the bearing main pad 411. The bearing housing 412 has an annular shape and is disposed outside the bearing main pad 411 in the radial direction Dr. The bearing housing 412 is supported on the bearing pedestal 24 via a housing support portion (not illustrated).

An upper portion of the journal bearing 41 is covered by a bearing pedestal cover 25. The bearing pedestal cover 25 forms a portion of the casing 2 and is detachably fixed onto the bearing pedestal 24 by using a bolt (not illustrated). The bearing pedestal cover 25 is disposed at an interval outside to the bearing housing 412 in the radial direction Dr.

As illustrated in FIG. 3, the probe device 10 includes the probe 11, a probe holding member 12, a guide sleeve 13, and a plurality of elastic support members 15.

(Configuration of Probe)

The probe 11 detects a state of the rotary shaft 31. In the embodiment of the present disclosure, the probe 11 is a vibration meter that detects vibrations of the rotary shaft 31 in the radial direction Dr orthogonal to the center axis O of the rotary shaft 31. The probe 11 has a columnar shape.

(Configuration of Probe Holding Member)

The probe holding member 12 is a cylindrical member that extends linearly from a first end 12a toward a second end 12b. The probe holding member 12 is disposed with respect to the journal bearing 41 such that an extending direction De of the probe holding member 12 coincides with the radial direction Dr. The extending direction De is a direction in which the first end 12a and the second end 12b of the probe holding member 12 are connected to each other. The first end 12a of the probe holding member 12 can be fixed to the journal bearing 41. The probe 11 is fixed to the first end 12a of the probe holding member 12.

Specifically, a male screw groove 12n is formed on an outer peripheral surface of the first end 12a of the probe holding member 12. The first end 12a of the probe holding member 12 is inserted into a holding member insertion hole 412h formed in the bearing housing 412. A female screw groove 412m that meshes with the male screw groove 12n is formed on an inner peripheral surface of the holding member insertion hole 412h. The first end 12a of the probe holding member 12 is fixed to the bearing housing 412 by being screwed into the holding member insertion hole 412h.

A probe insertion hole 12h into which the probe 11 can be inserted is formed in the first end 12a of the probe holding member 12. The probe 11 is press-fitted into the probe insertion hole 12h such that the probe 11 is held by the probe holding member 12. In the probe 11, a tip portion 11s thereof protrudes inward in the radial direction Dr from the probe holding member 12. The probe 11 detects displacement of the rotary shaft 31 in the radial direction Dr by disposing the tip portion 11s to be close to the outer peripheral surface of the rotary shaft 31. A wire (not illustrated) of the probe 11 is inserted into the cylindrical probe holding member 12 and is led outward of the casing 2.

(Configuration of Guide Sleeve)

As illustrated in FIG. 3, the guide sleeve 13 is fixed to the bearing pedestal cover 25 which forms a portion of the casing 2. The bearing pedestal cover 25 has a communication hole 26 through which an inside and an outside of the casing 2 communicate with each other. The communication hole 26 penetrates the bearing pedestal cover 25 linearly along the radial direction Dr. The communication hole 26 is formed at a position continuous with the holding member insertion hole 412h when the communication hole 26 extends in the radial direction Dr. A female screw portion 26n is formed on an inner peripheral surface of the communication hole 26.

The guide sleeve 13 is formed in a cylindrical shape. The outer peripheral surface of the guide sleeve 13 includes a male screw portion 13n screwed into the female screw portion 26n. The guide sleeve 13 is inserted into the communication hole 26 from the outside (outside side of the casing 2) in the radial direction Dr, and the male screw portion 13n is screwed into the female screw portion 26n. Here, the male screw portion 1311 is a tapered screw having a screw diameter which gradually decreases inward from the outside in the radial direction Dr, that is, toward the first end 12a side of the probe holding member 12.

In addition, the guide sleeve 13 is formed to have a length extending from the outside of the casing 2 to an intermediate portion of the communication hole 26, when the guide sleeve 13 is inserted into the communication hole 26 from the outside of the casing 2. That is, the length of the guide sleeve 13 in the radial direction Dr is shorter than the length of the communication hole 26 in the radial direction. Therefore, the guide sleeve 13 is disposed to overlap the communication hole 26 only in a portion of the outside (outer side of the casing 2) in the radial direction Dr in the communication hole 26.

The second end 12b of the probe holding member 12 is inserted into the guide sleeve 13 formed in this way. An inner diameter of the guide sleeve 13 is slightly larger than an outer diameter of the second end 12b of the probe holding member 12. That is, a minute gap is formed between the inner peripheral surface of the guide sleeve 13 and the outer peripheral surface of the probe holding member 12. In addition, the probe holding member 12 is exposed inside the communication hole 26 in an inner portion in the radial direction Dr from the guide sleeve 13. Inside the communication hole 26, a space 26s is formed between the outer peripheral surface of the probe holding member 12 and the inner peripheral surface of the communication hole 26.

The plurality of elastic support members 15 are disposed between the outer peripheral surface of the probe holding member 12 and the inner peripheral surface of the guide sleeve 13 at a position close to the second end 12b. The plurality of elastic support members 15 are disposed at an interval in the extending direction De of the probe holding member 12. Each of the elastic support members 15 has an annular shape extending along the outer peripheral surface of the probe holding member 12. Each of the elastic support members 15 is formed of an elastic material such as a rubber-based material or a silicone-based material. The elastic support member 15 is a so-called O-ring. In the embodiment of the present disclosure, the respective elastic support members 15 are fitted into grooves formed at an interval in the extending direction De on the outer peripheral surface of the probe holding member 12. The groove is continuous along the outer peripheral surface of the probe holding member 12 over the entire periphery in a circumferential direction. Each of the elastic support members 15 fitted into the groove is in close contact with the inner peripheral surface of the guide sleeve 13. Each of the elastic support members 15 elastically deforms in a compression direction between the second end 12b of the probe holding member 12 and the inner peripheral surface of the guide sleeve 13. The probe holding member 12 is elastically supported inside the guide sleeve 13 by the elastic support members 15.

In the embodiment of the present disclosure, for example, two elastic support members 15 as described above are disposed at an interval in the extending direction De. Three or more elastic support members 15 can be disposed at an interval in the extending direction De.

In addition, at least one of the plurality of elastic support members 15 is disposed at a position where the elastic support member 15 overlaps at least one of the male screw portion 13n and the female screw portion 26n in the extending direction De. In the embodiment of the present disclosure, an outer elastic support member 15A which is the elastic support member 15 located outside in the radial direction Dr is disposed at a position where the outer elastic support member 15A overlaps the female screw portion 26n in the extending direction De.

A cap 18 is mounted on the guide sleeve 13 into which the second end 12b of the probe holding member 12 is inserted. The cap 18 closes an opening of the guide sleeve 13 which faces the outer side of the casing 2.

(Operational Effect)

In the probe device 10 having the above-described configuration, the first end 12a of the probe holding member 12 that holds the probe 11 is fixed to the bearing portion 4. The second end 12b of the probe holding member 12 is inserted into the guide sleeve 13. The plurality of elastic support members 15 are disposed at an interval in the extending direction De of the probe holding member 12 between the second end 12b of the probe holding member 12 and the inner peripheral surface of the guide sleeve 13. In this manner, the second end 12b of the probe holding member 12 is stably held in the guide sleeve 13 to be concentric with the guide sleeve 13 by the plurality of elastic support members 15 disposed at an interval. Therefore, the second end 12b of the probe holding member 12 can be fixed without using a nut. In this manner, it is possible to suppress damage to the probe holding member 12 which may be caused by excessive tightening of the nut. In addition, when the probe device 10 is assembled, the probe holding member 12 may be inserted into the guide sleeve 13. As a result, damage can be suppressed while an increase in labor for mounting work is also suppressed.

In addition, the outer elastic support member 15A disposed at the position closest to the outside, which is at least one elastic support member 15 of the plurality of elastic support members 15, is disposed at the position where the outer elastic support member 15A overlaps the female screw portion 26n of the communication hole 26 in the extending direction De. In this manner, the second end 12b of the probe holding member 12 is fixed at a position extremely close to a position where the guide sleeve 13 is fixed to the casing 2. Therefore, the second end 12b of the probe holding member 12 can be more firmly held while the elastic support member 15 formed of the elastic material is used.

In addition, the male screw portion 13n is a tapered screw having a screw diameter which gradually decreases toward the first end 12a side of the probe holding member 12. In this manner, the guide sleeve 13 can be easily aligned with a center of the communication hole 26 formed in the casing 2. Therefore, the second end 12b of the probe holding member 12 inserted into the guide sleeve 13 can be aligned with the center of the communication hole 26.

In addition, the guide sleeve 13 is disposed only in a portion of the communication hole 26 closer to the outside of the casing 2. In this manner, the length of the guide sleeve 13 in the extending direction De may be reduced. Therefore, when the guide sleeve 13 is attached to or detached from the communication hole 26, it is possible to reduce a possibility that the guide sleeve 13 may interfere with other members located in the vicinity of the outside of the casing 2. In addition, in the communication hole 26, the guide sleeve 13 is not disposed on the inner side of the casing 2. Therefore, a large space 26s can be secured between the probe holding member 12 and the inner peripheral surface of the communication hole 26. In this manner, due to the vibrations or misalignment of the rotary shaft 31, the bearing portion 4 to which the first end 12a of the probe holding member 12 is fixed and the casing 2 to which the second end 12b of the probe holding member 12 is fixed deform relative to each other. Accordingly, even when the probe holding member 12 is displaced inside the communication hole 26, the probe holding member 12 is less likely to interfere with the inner peripheral surface of the communication hole 26.

In addition, the probe 11 is a vibration meter that detects the vibrations of the rotary shaft 31. The vibration meter is provided in a place where the rotary shaft 31 is likely to be displaced due to the vibrations or the misalignment. The first end 12a of the probe holding member 12 that supports the probe 11 serving as the vibration meter is fixed to the bearing portion 4, and the second end 12b is supported by the guide sleeve 13 provided in the casing 2 via the plurality of elastic support members 15. In this manner, the vibration meter can be more stably held. Accordingly, damage can be suppressed while an increase in labor for mounting work is suppressed.

Other Embodiments

Hitherto, the embodiment of the present disclosure has been described in detail with reference to the drawings. However, a specific configuration is not limited to the embodiment and includes design changes within the scope not departing from the concept of the present disclosure.

In the above-described embodiment, the guide sleeve 13 is provided only in a portion of the communication hole 26. However, the present invention is not limited thereto. For example, the guide sleeve 13 may be provided to protrude inward in the radial direction Dr from the bearing pedestal cover 25.

In addition, the probe holding member 12 has a cylindrical shape extending in the extending direction De. However, the probe holding member 12 may be configured to have one or more joints in the extending direction De and may be configured to be bendable.

In addition, the vibration meter is used as an example of the probe 11. However, the present disclosure is not limited thereto. For example, the probe 11 may be a thermometer as long as the thermometer detects a state of the rotary shaft 31.

In addition, an installation position or the number of installed probe devices 10 illustrated in the above-described embodiment can be changed as appropriate.

In addition, the steam turbine 1 has been described as an example of the rotary machine. However, the present disclosure is not limited thereto. For example, a centrifugal compressor may be adopted as long as the centrifugal compressor is the rotary machine including the rotary shaft.

<Appendix>

The probe device 10 according to the embodiment is understood as follows, for example.

(1) According to a first aspect, the probe device 10 is provided that is configured to measure a state of the rotary shaft 31 supported by the bearing portion 4 disposed inside the casing 2 of the rotary machine. The probe device 10 includes a probe 11 capable of detecting the state of the rotary shaft 31, the probe holding member 12 having the first end 12a fixed to the bearing portion 4, and in which the probe 11 is configured to fix to the first end 12a, the guide sleeve 13 is configured to insert into the communication hole 26 through which the inside and the outside of the casing 2 communicate with each other and is formed a cylindrical shape, and into which the second end 12b of the probe holding member 12 is inserted, and the plurality of elastic support members 15 disposed at an interval in the extending direction De of the probe holding member 12 connecting the first end 12a and the second end 12b to each other between the second end 12b of the probe holding member 12 and the inner peripheral surface of the guide sleeve 13, and formed of the elastic material to form the annular shape extending along the outer peripheral surface of the probe holding member 12.

Examples of the rotary machine include the steam turbine 1 and the centrifugal compressor. In addition, examples of the probe 11 include the vibration meter and the thermometer. In addition, examples of the elastic material include a rubber-based material and a silicone-based material.

The second end 12b of the probe holding member 12 is stably held in the guide sleeve 13 by the plurality of elastic support members 15 disposed at an interval. Therefore, the second end 12b of the probe holding member 12 can be fixed without using a nut. In this manner, it is possible to suppress damage to the probe holding member 12 which may be caused by excessive tightening of the nut. In addition, when the probe device 10 is assembled, the probe holding member 12 may be inserted into the guide sleeve 13. As a result, damage can be suppressed while an increase in labor for mounting work is suppressed.

(2) In the probe device 10 according to a second aspect of the probe device 10 of (1), the outer peripheral surface of the guide sleeve 13 has the male screw portion 13n which is configured to screw into the female screw portion 26n formed on the inner peripheral surface of the communication hole 26. At least one of the plurality of elastic support members 15 is disposed at a position where the at least one of the plurality of elastic support members 15 overlaps at least one of the male screw portion 13n and the female screw portion 26n in the extending direction De.

In this manner, the second end 12b of the probe holding member 12 is fixed at a position close to a portion where the guide sleeve 13 is fixed to the casing 2. Therefore, the second end 12b of the probe holding member 12 can be more firmly held while the elastic support member 15 formed of the elastic material is used.

(3) In the probe device 10 according to a third aspect of the probe device 10 of (2), the male screw portion 13n is the tapered screw having the screw diameter which gradually decreases toward the first end 12a of the probe holding member 12.

In this manner, the guide sleeve 13 can be easily aligned with a center of the communication hole 26 formed in the casing 2. Therefore, the second end 12b of the probe holding member 12 inserted into the guide sleeve 13 can be aligned with the center of the communication hole 26.

(4) In the probe device 10 according to a fourth aspect of any one of the probe devices 10 from (1) to (3), the guide sleeve 13 is formed to have the length extending from the outside of the casing 2 to the intermediate portion of the communication hole 26, when the guide sleeve 13 is inserted into the communication hole 26.

In this manner, the length of the guide sleeve 13 in the extending direction De may be reduced. When the guide sleeve 13 is attached to or detached from the communication hole 26, it is possible to suppress a possibility that the guide sleeve 13 may interfere with other members located on the outer peripheral side of the casing 2. In addition, in the communication hole 26, the guide sleeve 13 is not provided on the inner side of the casing 2. Therefore, a large space 26s can be secured between the probe holding member 12 and the inner peripheral surface of the communication hole 26. In this manner, due to the vibrations or the misalignment of the rotary shaft 31, the bearing portion 4 and the casing 2 relatively deform. Accordingly, even when the probe holding member 12 is displaced inside the communication hole 26, the probe holding member 12 is less likely to interfere with the inner peripheral surface of the communication hole 26.

(5) In the probe device 10 according to a fifth aspect of any one of the probe devices 10 from (1) to (4), the probe 11 is the vibration meter that detects the vibrations of the rotary shaft 31.

In this manner, the vibration meter is provided at a place where the rotary shaft 31 is likely to be displaced due to the vibrations or the misalignment. The first end 12a of the probe holding member 12 that supports the vibration meter is fixed to the bearing portion 4, and the second end 12b is supported by the guide sleeve 13 provided in the casing 2 via the plurality of elastic support members. In this manner, the vibration meter can be more stably held. Accordingly, damage can be suppressed while an increase in labor for mounting work is suppressed.

EXPLANATION OF REFERENCES

1: steam turbine (rotary machine)
2: casing
3: rotor
4: bearing portion
4A: first bearing portion
4B: second bearing portion
10: probe device
11: probe
11s: tip portion
12: probe holding member
12a: first end
12b: second end
12m: groove
12n: male screw groove
12h: probe insertion hole
13: guide sleeve
13n: male screw portion
15: elastic support member
15A: outer elastic support member
18: cap
21: steam inlet
22: steam outlet
24: bearing pedestal
25: bearing pedestal cover
26: communication hole
26n: female screw portion
26s: space 31: rotary shaft
32: rotor blade
41: journal bearing
411: bearing main pad
412: bearing housing
412*h*: holding member insertion hole
412*m*: female screw groove
42: thrust bearing
Da: axial direction
Dc: circumferential direction
De: extending direction
Dr: radial direction
O: center axis

What is claimed is:

1. A probe device that is configured to measure a state of a rotary shaft supported by a bearing portion located inside a casing of a rotary machine, the probe device comprising:
a probe that is configured to detect the state of the rotary shaft;
a probe holding member having a first end which is configured to fix to the bearing portion, in which the probe is fixed to the first end;
a guide sleeve that is configured to insert into a communication hole through which an inside and an outside of the casing communicate with each other and is formed a cylindrical shape, a second end of the probe holding member being inserted into the guide sleeve; and
elastic support members disposed at an interval in an extending direction of the probe holding member connecting the first end and the second end to each other between the second end of the probe holding member and an inner peripheral surface of the guide sleeve, and formed of an elastic material to form an annular shape extending along an outer peripheral surface of the probe holding member, wherein
the guide sleeve is formed to have a length extending from the outside of the casing to an intermediate portion of the communication hole, when the guide sleeve is inserted into the communication hole,
the communication hole has a space between the outer peripheral surface of the probe holding member and an inner peripheral surface of the communication hole, and
the elastic support members are disposed only between the second end of the probe holding member and the inner peripheral surface of the guide sleeve in the communication hole, such that none of the elastic support members are disposed within the space of the communication hole.

2. The probe device according to claim 1, wherein
an outer peripheral surface of the guide sleeve has a male screw portion which is configured to screw into a female screw portion formed on an inner peripheral surface of the communication hole, and
at least one of the elastic support members is disposed at a position where the at least one of the elastic support members overlaps at least one of the male screw portion and the female screw portion in the extending direction.

3. The probe device according to claim 2, wherein the male screw portion is a tapered screw having a screw diameter which gradually decreases toward the first end of the probe holding member.

4. The probe device according to claim 1, wherein the probe is a vibration meter that detects vibrations of the rotary shaft.

* * * * *